Aug. 26, 1958     J. K. GODBEY     2,849,075
SELF-SUSTAINING OSCILLATORY ACOUSTIC WELL LOGGING
Filed March 23, 1953
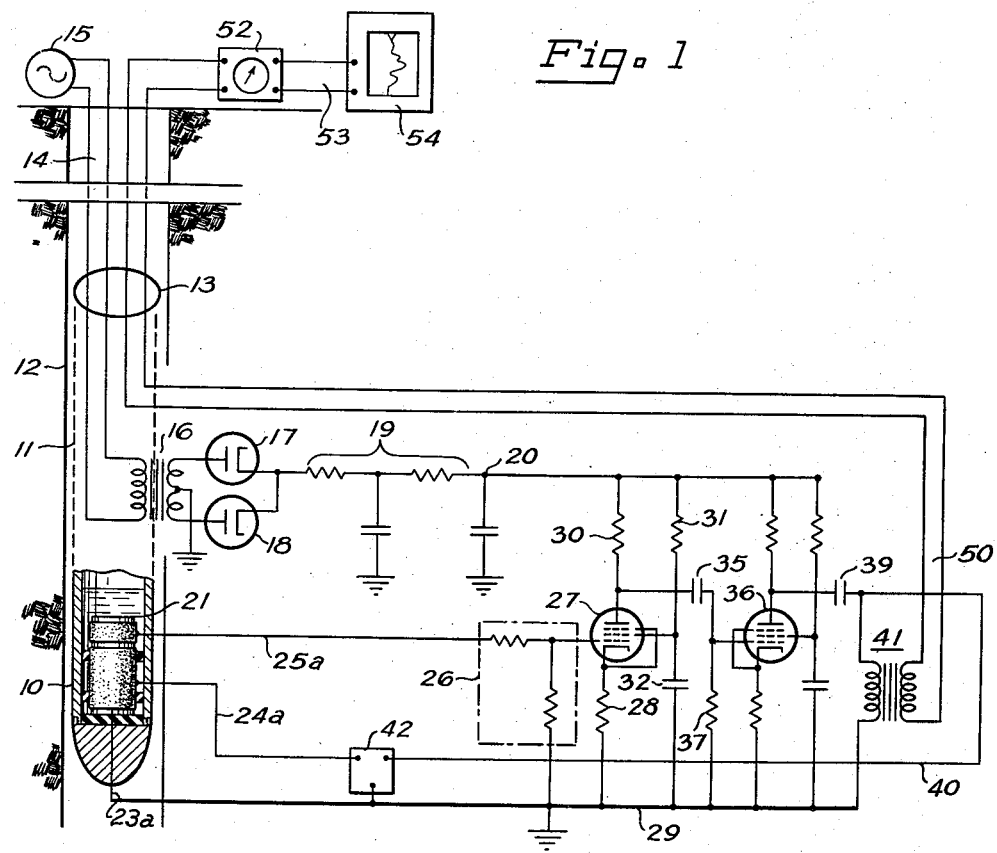
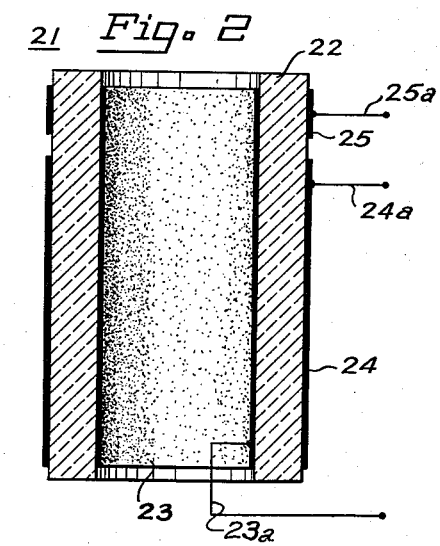
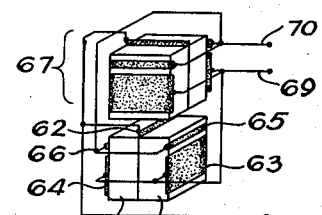
JOHN K. GODBEY
INVENTOR.
BY D. Carl Richards
ATTORNEY

United States Patent Office 2,849,075
Patented Aug. 26, 1958

2,849,075

SELF-SUSTAINING OSCILLATORY ACOUSTIC WELL LOGGING

John K. Godbey, Dallas, Tex., assignor, by mesne assignments, to Socony Mobil Oil Company, Inc., a corporation of New York Application March 23, 1953, Serial No. 344,090

7 Claims. (Cl. 181—.5)

This invention relates to an acoustic sensing system and more particularly to a reaction type system for studying media acoustically coupled thereto.

Studies of the acoustic properties of sound transmitting materials are important in a number of fields and are particularly important in the study of formations penetrated by a bore hole for the reason that materials not immediately available for visual inspection may be subjected to a physical field of influence and the effect of the medium on this field of influence may be determined. There are a number of systems known in the prior art relating to acoustic well logging and the present invention represents an improvement over prior art systems by the provision of a novel sensing system for determining the reaction of the medium on a transducer coupled thereto.

In accordance with the present invention there is provided an acoustic well logging system comprising an exploring unit which is supported for movement through a bore hole. An oscillatory electromechanical loop is included in the exploring unit and is comprised of a unitary electro-acoustic transducer and an amplifier connected at both its input and output to the transducer. The amplifier preferably has a phase shift between input and output of substantially 360°. A source of electrical energy is provided for supplying the amplifier thereby to produce an oscillatory signal at the output of the amplifier dependent upon the properties of the unitary transducer as modified by conditions in the bore hole. A circuit connected to the output of the amplifier and including measuring means is positioned at the mouth of the well bore for detecting variation in the output, either frequency and/or amplitude, as an index to variations in the conditions in the well bore.

In accordance with the preferred form of the invention the electro-acoustic transducer is comprised of a piezo-electric device having three conductive elements mounted thereon, one pair of which is connected to the input of the amplifier and a different pair of which is connected to the output of the amplifier.

For a more complete description of the invention and for further objects and advantages thereof, reference may now be had to the following description taken in conjunction with the accompanying drawings in which:

Fig. 1 is a diagrammatic representation of the invention;

Fig. 2 is an enlarged cross-sectional view of a suitable transducer means; and

Fig. 3 illustrates a suitable modification of the transducer means.

Referring now to Fig. 1, there is illustrated an exploring unit 10, the lower portion of which is illustrated in section with the upper portion 11 diagrammatically represented by the dotted enclosure representing tubular housing means such as employed in the well logging art. The exploring unit is supported for movement along the length of a bore hole 12 by means of a suitable strength member (not shown) forming or supporting a liquid-tight sheath for electrical circuit means generically represented as enclosed within a sheath 13. A first pair of cable conductors 14 extend from a power source 15 at the earth's surface to a transformer 16. The secondary winding of the transformer 16 is connected to the anodes of rectifiers 17 and 18. The center tap on the transformer is connected to a ground, which may be the case of the exploring unit 10. The cathodes of diodes 17 and 18 are connected together and to a filter network 19. The foregoing structure forms a power supply to provide a D. C. operating voltage at terminal 20.

A piezo-electric transduced 21, preferably of a ferroelectric poly-crystalline dielectric material, is supported within the enclosure at the lower end of the exploring unit 10 and is provided with at least three electrodes.

As best shown in Fig. 2, the transducer comprises an elongated cylinder 22 of a material such as barium titanate having its inner surface coated with a metallic or conductive sheath 23. The outer surface is coated with two conductive cylinders or rings 24 and 25. Ring 24 covers a substantial portion of the exterior of the cylinder while ring 25, insulated from ring 24 and spaced therefrom, covers but a minor fraction. Electrical leads 23a, 24a and 25a are connected to each of the three electrodes 23, 24, 25, respectively.

Referring to Fig. 1, it will be seen that the lead 25a is connected through an input network 26 to the input grid of an amplifier pentode 27. The cathode of pentode 27 is connected through resistance 28 to a ground bus 29 and the anode of tube 27 is connected by way of resistor 30 to the B+ terminal 20. The screen grid of tube 27 is provided with an operating voltage by way of resistor 31 and is by-passed to ground by way of condenser 32. The anode of tube 27 is connected by way of condenser 35 to the input or control grid of a second pentode 36. The grid is also connected to ground conductor 29 by means of resistor 37. The circuit of tube 36 is identical with tube 27 except for the magnitude of voltages and components necessary to accommodate amplified signals from tube 27. The output of tube 36 is connected by way of condenser 39 to an output circuit which includes a feed-back conductor 40 as a first branch thereof and the primary winding of an output transformer 41 as a second branch thereof. The feed-back conductor 40 is connected through phase shift network 42 to conductor 24a. Network 42 may be of conventional design and operates to compensate for any deviation from a 360 degree phase shift of signals passing through the two-stage amplifier comprised of tubes 27 and 36. The ground conductor 29 is connected to the conductor 23a.

With the foregoing circuit connections when the power from source 15 is applied through the power supply having as its output the terminal 20, the output of tube 36 is applied to the transducer through electrodes 23 and 24 to electromechanically drive the crystal transducer 21. The application of output voltages from tube 36 produces dimensional changes in the crystal structure which produce voltage variations between the inner electrode 23 and the smaller electrode 25. The latter voltage is effective on the input grid of tube 27 to excite the amplifier thus tending to produce operation of the amplifier in a mode controlled principally by the excitation upon crystal 21 and the reaction of the adjacent formations upon the crystal. The system basically is an electromechanical oscillator when the voltage on conductor 24a is in phase with the voltage on conductor 25a.

As illustrated the transducer is inundated in a liquid bath, preferably a non-conducting oil such as castor oil, for transmission of sound vibrations to the adjacent formations. Thus the mode of operation of the amplifier is controlled principally by formation character.

The output of the amplifier as applied to transformer 41 may then be measured to produce a log of distinctive character related to the formations. As illustrated the secondary winding of transformer 41 is connected by way of conductors 50 to a measuring system at the earth's surface which may include a voltmeter and/or a frequency meter such as might be embodied in the unit 52. The output of meter 52 is coupled by way of conductors 53 to a chart recorder 54. As is well understood by those skilled in the art, the recorder 54 may be a recording potentiometer in which the lateral position of the recording pen is controlled by the condition dependent voltage on conductors 53. The longitudinal movement of the chart with reference to the pen is controlled or made proportional to movement of the exploring unit along the length of the bore hole.

Thus there is provided at output transformer 41 a condition controlled parameter which is detected at the surface and recorded on a chart, the controlling condition being principally the reaction on the transducer 21 of the adacent formations as the transducer relates acoustic energy to such formations.

The system of Figs. 1 and 2 includes a cylindrical transducer for producing a substantially cylindrical field pattern. In Fig. 3 there is illustrated a suitable transducer system based upon the use of flat or planar type crystal units.

More particularly, a first pair of crystals 60 and 61 are on opposite sides and in contact with a conductive sheet 62. Sheet 62 forms one electrode. Conductive plates 63 and 64 are mounted on faces of crystals 60 and 61 facing the electrode 62. On the same faces there are provided auxiliary electrodes 65 and 66. A second crystal structure 67 identical with that just described is provided with like elements being interconnected. For example, the central plates 62 forming the common electrode are connected to conductor 68. The exciting electrodes on the outer faces of the crystals are all connected to the terminal 69 and the auxiliary electrodes on the outer faces are all connected to the terminal 70. The crystals are oriented so that the central electrodes are mutually perpendicular in order to provide a substantially cylindrical radiating pattern for the unit with a wall. This crystal unit may be substituted directly in the system of Fig. 1 with the conductors 68, 69 and 70 corresponding to conductors 23a, 24a and 25a, respectively.

The measured output function from transformer 41 may be the magnitude of the generated voltage, the plot of such voltage yielding distinctive characteristics as formations of varying lithology are probed by the acoustic energy emanating from the crystal transducer. Alternatively the frequency of the signal from transformer 41 may be charted similarly to yield a characteristic log.

It has been found that among the factors which primarily influence the operating frequency and the amplitude of the signal output from the oscillator are (1) density of the formation, (2) bore hole diameter and (3) acoustic impedance of the formation. These primary factors and other secondary factors are known to contribute to a log obtained with a logging system of the type herein disclosed. It has further been found that the foregoing factors produce distinctive character changes on such logs as to permit the delineation of the formations through which a bore hole extends.

While the invention has been illustrated and described in connection with certain modifications thereof, it will now be appreciated that other modifications may appear to those skilled in the art and it is intended to cover such modifications as fall within the scope of the appended claims.

What is claimed is:

1. An acoustic well logging system comprising an exploring unit which includes a piezo-electric element, a first electrode in contact with a first surface of said element, a second electrode and a third electrode spaced apart in contact with the surface of said element opposite said first electrode, a two stage amplifier connected at its input to the first and second of said electrodes for producing at its output voltages shifted in phase substantially 360° from voltages applied to the input thereof, a first circuit connected between said output and said first and third electrodes for applying said output to said piezo-electric element and thereby to complete a feedback loop for producing oscillations whose frequency is dependent upon the properties of said element as modified by conditions in said bore hole, and a second circuit connected to said output and including measuring means at the mouth of said well bore for detecting variations in the frequency of said output as an index to variations in said conditions.

2. In an acoustic well logging system having piezo-electric transducer means the combination which comprises conducting means on one surface of said crystal forming a first terminal, conducting means covering a portion of a second surface to form a second terminal, means for applying to said terminals oscillatory power to produce dimensional changes in said crystal and transmit resultant vibrations to adjacent formations, conducting means covering an additional portion of said second surface forming a third terminal thereon, and measuring means connected to said first and third terminals for measuring variations in the dimensional changes of said crystal as produced by said power and as modified by the reaction of the formations thereon.

3. An acoustic well logging system comprising an exploring unit including a piezo-electric element, cable means for supporting said unit for movement along the length of a bore hole, a first electrode in contact with a first surface of said element, a second electrode and a third electrode spaced apart in contact with the surface of said element opposite said first electrode, an amplifier having input terminals and output terminals, means for connecting said output terminals to said first and second electrodes to drive said element in accordance with the output of said amplifier for the production of acoustic waves which penetrate formations adjacent said bore hole, means for connecting said first and third electrodes to said input terminals to control said amplifier in dependence upon the combined effect of the reaction of the formations on said element and the driving of said element by said amplifier, and means connected to said cable means at the earth's surface for measuring variations in the output of said amplifier as said element is moved along the length of said bore hole.

4. An acoustic well logging system comprising an exploring unit including a piezo-electric element, cable means for supporting said unit for movement along the length of a bore hole, a first electrode electrically in contact with a first surface of said element, a second electrode and a third electrode spaced apart in contact with the surface of said element opposite said first electrode, an amplifier having input terminals and output terminals, means for connecting said output terminals to said first and second electrodes to drive said element in accordance with the output of said amplifier for the production of acoustic waves which penetrate formations adjacent said bore hole, means for connecting said first and third electrodes to said input terminals to control said amplifier in dependence upon the combined effect of the reaction of the formations on said element and the driving of said element by said amplifier, and means connected to said cable means at the earth's surface for measuring variations in the frequency of the output of said amplifier as said element is moved along the length of said bore hole.

5. An acoustic well logging system comprising an exploring unit including a piezo-electric element, cable means for supporting said unit for movement along the length of a bore hole, a first electrode electrically in contact with a first surface of said element, a second electrode and a third electrode spaced apart in contact with the surface of said element opposite said first electrode, an amplifier having input terminals and output terminals, means for connecting said output terminals to said cable means and to said first and second electrodes to drive said element in accordance with the output of said amplifier for the production of acoustic waves which penetrate formations adjacent said bore hole, means for connecting said first and third electrodes to said input terminals to produce a signal on said cable dependent upon the combined effect of the reaction of the formations on said element and the driving of said element by said amplifier, and means connected to said cable means at the earth's surface for measuring variations in the amplitude of said signal as said element is moved along the length of said bore hole.

6. In an acoustic well logging system the combination which comprises an exploring unit including an acoustic transducer adapted to be supported for movement along the length of a well bore, energizing means for said transducer to produce a repetitive output signal therefrom, means for controlling said energizing means in dependence upon the energization of said transducer for causing said signal to vary in frequency primarily in dependence upon the acoustic loading of said transducer, means for producing an electrical signal which varies in dependence upon variations in the frequency content of said output signal, and means for recording said electrical signal in correlation with an indication of the depth at which said output signal is generated.

7. The method of geophysical prospecting which comprises generating at a continuously varying depth an acoustic signal for transmission into and for reflection from formations adjacent a well bore, self-controlling the generation of said acoustic signal whereby said signal varies in frequency in dependence upon characteristics of the formations adjacent the point of generation thereof, generating an electrical signal which varies in accordance with and in dependence upon variations in the frequency of said acoustic signal, and recording said electrical signal in correlation with an indication of the depth at which said acoustic signal was generated.

References Cited in the file of this patent

UNITED STATES PATENTS

| | | |
|---|---|---|
| 1,495,429 | Nicolson | May 27, 1924 |
| 1,780,567 | Rieber | Nov. 4, 1930 |
| 2,277,037 | Clark et al. | Mar. 24, 1942 |
| 2,440,903 | Massa | May 4, 1948 |
| 2,586,745 | Tullos | Feb. 19, 1952 |
| 2,595,241 | Goble | May 6, 1952 |
| 2,618,698 | Janssen | Nov. 18, 1952 |
| 2,722,282 | McDonald | Nov. 1, 1955 |

FOREIGN PATENTS

| | | |
|---|---|---|
| 856,314 | Germany | Nov. 20, 1952 |

OTHER REFERENCES

An article entitled "A Barium Titanate Transducer Capable of Large Motion at an Ultrasonic Frequency" by W. P. Mason and R. F. Wick on pages 209 to 214 of the Journal of the Acoustical Society of America, vol. 23, No. 2, March 1951.